July 17, 1923.        1,462,053
H. M. STOLLER
ELECTRICAL TESTING SYSTEM
Filed Nov. 13, 1920
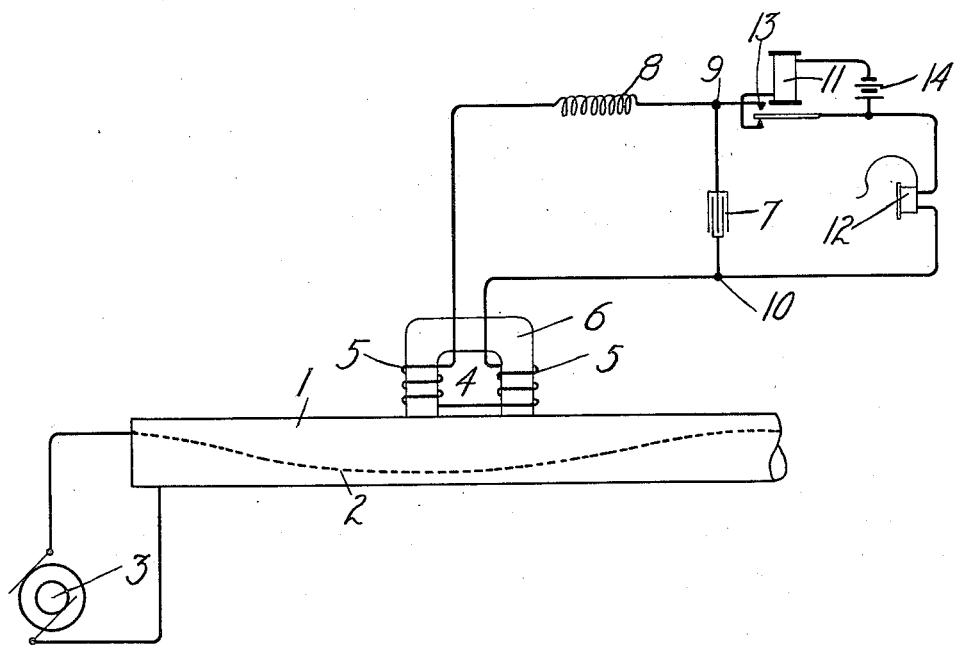
Inventor:
Hugh M. Stoller.
by Joel A. Palmer Att'y.

Patented July 17, 1923.

1,462,053

UNITED STATES PATENT OFFICE.

HUGH M. STOLLER, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed November 13, 1920. Serial No. 423,884.

*To all whom it may concern:*

Be it known that I, HUGH M. STOLLER, a citizen of the United States, residing at New York, in the county of New York, State of New York, have invented certain new and useful Improvements in Electrical Testing Systems, of which the following is a full, clear, concise, and exact description.

This invention relates in general to electrical testing systems, and more particularly to systems for locating faults in electrical conductors.

In conductors such as telephone lines it is extremely difficult to locate a fault when the length of line beyond the fault is of great length. This is due to the capacity effect either between the ground or cable sheath and the length of conductor beyond the fault, or, in the case where one side of the line is grounded through a high resistance leak, on account of the capacity of the two conductors of the line beyond the grounded point. It is becoming more and more the practice to use multi-conductor cables for long distance telephone trunk lines and one drawback to their use has been the difficulty of locating faults in them at any great distance from either end.

In methods heretofore employed a source of either alternating or pulsating current is impressed on the faulty conductor and by means of an instrument, ordinarily known as an exploring coil, the conductor is traced up to the fault which is either a short circuit, ground or cross with another conductor, of either high or low resistance. Due to the varying field about the conductor, the current induced thereby in the exploring coil produces a tone in the receiver of the apparatus, up to the fault beyond which no tone is heard. However, in order to produce an audible effect most efficiently the current impressed on the conductor must be of the order of from 800 to 1200 cycles, since this is the range at which a telephone receiver operates most efficiently. Below 800 cycles the receiver efficiency falls off rapidly. The use of current of these high frequencies, however, causes high capacity effects between the faulty conductor, the cable sheath and the conductors which are in service. The electrostatic effect thus produced extends the entire length of the conductors and cable sheath. As a result no appreciable difference can be detected in the receiver of the exploring coil on either side of the fault if the line be of great length.

It is the object of this invention to provide a system for locating faults in such conductors by means of an exploring coil, wherein these capacity effects are reduced to a negligible factor.

This is accomplished by the invention in its preferred form by impressing on the conductor current of a low frequency and increasing the frequency of the current induced thereby in the exploring coil up to the range at which a telephone receiver is most efficient.

In order to increase the efficiency, the fault locator circuit is tuned to resonance at the frequency of the impressed current. This eliminates interference due to capacity effects produced by higher harmonies of the impressed current.

Any desired method may be employed to increase the frequency of the induced current. The inventor, however, prefers a method which he considers a feature of his invention and which consists of periodically discharging the condenser employed to tune the circuit, through the receiver. The surging in the condenser produces oscillations in the receiver at a vibratory period corresponding to the receiver's most efficient frequency.

The invention may be more completely understood by reference to the drawing which shows diagrammatically the circuit arrangement employed and the application of the apparatus to the method of fault locating.

A cable 1 preferably having a lead sheath, which is grounded, has a plurality of conductors, of which one of the conductors 2 is shown (dotted), the lead sheath of the cable 1 is grounded, as is usually the practice in telephone or power installations.

The source of low frequency alternating current 3 is connected with conductor 2 and the sheath of the cable 1. Current flows over the conductor 2 to a fault in the conductor, which in this case, would be a ground of either high or low resistance, and back through the lead sheath of the cable 1 to the source of current 3.

For the purpose of locating a fault in the conductor 2, the exploring coil 4 is used, having the windings 5 about the core 6. The exploring coil 4 may be of any desired construction, the form preferred being that shown in Patent No. 1,170,017 issued to the inventor February 1, 1916.

The windings 5 are connected in a circuit which includes condenser 7 and an inductance element 8. The reactance values of the elements 7 and 8 are adjusted so that the circuit including exploring coil windings 5 is in resonance with the frequency of the current source 3.

Bridged about the condenser 7 is a circuit including contact 13 and the vibrating armature of an interrupter 11 and a telephone receiver 12. The interrupter 11 may be of any desired form. It is here shown as a direct current electromagnetic interrupter operated by a source of direct current 14 and having an additional contact 13 which completes the circuit of the telephone receiver 12 to discharge the condenser 7.

The inventor prefers the use of alternating current of 120 cycles to be impressed on the conductor 2. By the use of current of this low frequency very slight capacity effects occur between the conductor 2 and the other cable conductors not shown, and also in the cable sheath 1. The harmonics which will occur in the conductor 2 naturally produce capacity effects in the other conductors, but these are not picked up by the exploring coil 4 on account of the reactance of the circuit which has been adjusted by means of the condenser 7 and the inductance 8 to exclude these effects. The current induced in the windings 5 of the exploring coil 4 produces a charge in the condenser 7 which is periodically discharged by the interrupter 11 and causes an oscillation in the receiver 12. The oscillation of this discharge is of short duration, and it has been found that with interruptions occurring at the rate of about six per second, the oscillations produce a continuous series of clicks in the receiver 12. The capacity of the condenser 7 is adjusted with relation to the inductance of the receiver 12 so that current oscillations are produced at the rate of approximately one thousand per second. This is approximately the most efficient frequency for a telephone receiver.

In order that the instrument be practical for actual use in the field, the apparatus is enclosed in a suitable box and the exploring coil and receiver are attached thereto by flexible conductor cords.

Having described my invention, what I desire to protect and secure by Letters Patent will be pointed out in the appended claims.

What is claimed is:

1. In a system for locating faults in cable conductors, a source of variable current to be impressed on such faulty conductor, an exploring coil, a circuit including the exploring coil and tuned to resonance at the frequency of the source of variable current, and a current detector associated with said circuit.

2. In a system for locating faults in cable conductors, a source of variable current of low frequency to be impressed on such faulty conductor, an exploring coil, a circuit including the exploring coil and sharply tuned to resonance at the frequency of the variable current, and a current detecting device associated with said circuit.

3. In a system for locating faults in cable conductors, a source of variable current of low frequency to be impressed on such faulty conductor, an exploring coil, a circuit for the exploring coil including an inductance element and a capacity element to tune the circuit to resonance at the frequency of the variable current, a telephone receiver and means for directing a portion of the current flowing in the said circuit through the receiver at an increased frequency rate.

4. In a system for locating faults in cable conductors, a source of sinusoidal, low frequency current to be connected with such faulty conductor; an exploring coil, a tuned circuit resonant at the frequency of said current and including a condenser element; a vibrating relay; a telephone receiver; and a circuit in shunt relation to said condenser element including said telephone and vibrating relay, whereby a series of current oscillations is caused at each vibration of said relay to flow through the receiver.

5. In combination with an exploring coil, a condenser to be charged by current induced in said exploring coil, a telephone receiver, and means to periodically discharge the condenser through the receiver.

6. In combination with an exploring coil, a circuit therefor, and reactance elements to tune said circuit to resonance at a predetermined current frequency.

7. In combination with an exploring coil, a circuit therefor, and reactance elements to produce a condition of resonance in said circuit at a current frequency lower than the efficient range of a telephone receiver.

8. In combination with an exploring coil, a circuit therefor, an inductance element and a condenser included in said circuit to produce a condition of resonance therein at a frequency below the efficient range of a telephone receiver, a telephone receiver associated with said circuit, and means to periodically discharge the condenser through the receiver.

9. In combination with an exploring coil, a circuit therefor, an inductance element and a condenser included in said circuit to produce a condition of resonance therein at a frequency below the efficient range of a telephone receiver, a telephone receiver, and a vibrating interrupter device to periodically discharge the condenser through the receiver.

10. In an exploring coil system, a means for increasing the frequency of the current induced therein, which comprises a condenser in circuit with the exploring coil and adapted to be charged by current induced therein, and a circuit in shunt relation with the condenser and including a means for periodically closing and opening said circuit, whereby the charge of the condenser oscillates in the shunt circuit at a frequency higher than the frequency of the current induced in the exploring coil.

In witness whereof, I hereunto subscribe my name this 11th day of November A. D., 1920.

HUGH M. STOLLER.